US012585545B2

(12) United States Patent
Phatak et al.

(10) Patent No.: US 12,585,545 B2
(45) Date of Patent: Mar. 24, 2026

(54) DYNAMIC ADJUSTMENTS OF BACKUP POLICIES

(71) Applicant: HEWLETT PACKARD ENTERPRISE DEVELOPMENT LP, Spring, TX (US)

(72) Inventors: Anand Satish Phatak, Bangalore (IN); Smitha Jayaram, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/176,628

(22) Filed: Mar. 1, 2023

(65) Prior Publication Data

US 2024/0296098 A1 Sep. 5, 2024

(51) Int. Cl.
*G06F 11/1446* (2026.01)

(52) U.S. Cl.
CPC ...... *G06F 11/1451* (2013.01); *G06F 11/1461* (2013.01); *G06F 2201/80* (2013.01)

(58) Field of Classification Search
CPC ............. G06F 11/1451; G06F 11/1461; G06F 2201/80
See application file for complete search history.

(56) References Cited

U.S. PATENT DOCUMENTS 7,984,085 B1 * 7/2011 Aggarwal ............. G06F 16/128
707/821
9,720,783 B1 * 8/2017 Kulkarni ............. G06F 11/1461

| | | | |
|---|---|---|---|
| 10,417,099 B1 | 9/2019 | Yadav et al. | |
| 10,437,487 B2 | 10/2019 | Balcha | |
| 10,536,471 B1 * | 1/2020 | Derbeko | G06F 21/53 |
| 10,824,375 B1 | 11/2020 | Natanzon et al. | |
| 10,877,928 B2 | 12/2020 | Nagrale et al. | |
| 11,397,650 B1 | 7/2022 | Palaiah et al. | |
| 2012/0089572 A1 * | 4/2012 | Raichstein | G06F 11/1461 707/645 |
| 2016/0048408 A1 | 2/2016 | Madhu et al. | |
| 2019/0235971 A1 | 8/2019 | Botelho et al. | |
| 2020/0019424 A1 | 1/2020 | Wang et al. | |
| 2021/0049079 A1 | 2/2021 | Kumar et al. | |
| 2021/0117377 A1 | 4/2021 | Savir et al. | |
| 2022/0229744 A1 * | 7/2022 | Freilich | G06F 11/1469 |

(Continued)

OTHER PUBLICATIONS

Bose, "What is VMware Changed Block Tracking (CBT) and How Does It Work?". Dec. 14, 2022, 11 pages.

(Continued)

*Primary Examiner* — Tony Wu
(74) *Attorney, Agent, or Firm* — Slater Matsil, LLP

(57) ABSTRACT

In some examples, a system computes a rate of change of data blocks of a collection of storage volumes in a data store, where changes of data blocks are detected based on monitoring of operations on the collection of storage volumes. The rate of change of data blocks of the collection of storage volumes is based on a difference between a plurality of snapshots of data of the collection of storage volumes in the data store. Based on the rate of change of data blocks of the collection of storage volumes, the system dynamically adjusts a backup policy governing backups of data of the collection of storage volumes to a backup store, wherein the dynamic adjustment of the backup policy changes a quantity of the backups of data of the collection of storage volumes.

17 Claims, 4 Drawing Sheets

(56) References Cited

U.S. PATENT DOCUMENTS

| | | | |
|---|---|---|---|
| 2022/0327032 A1* | 10/2022 | Chang | G06F 11/1451 |
| 2023/0229565 A1* | 7/2023 | Cheriyan | G06F 11/1461 |
| | | | 707/654 |
| 2023/0379349 A1* | 11/2023 | Hamilton | H04L 63/0428 |
| 2024/0126584 A1* | 4/2024 | Bagchi | G06F 9/45558 |

OTHER PUBLICATIONS

IBM, "IBM Spectrum Protect for Virtual Environments: Data Protection forVMware—Overview of Change Block Tracking", Jun. 17, 2018, 4 pages.

Macomber, "Air gap backups provide another layer of protection", Oct. 29, 2021, 3 pages.

\* cited by examiner

Process
500

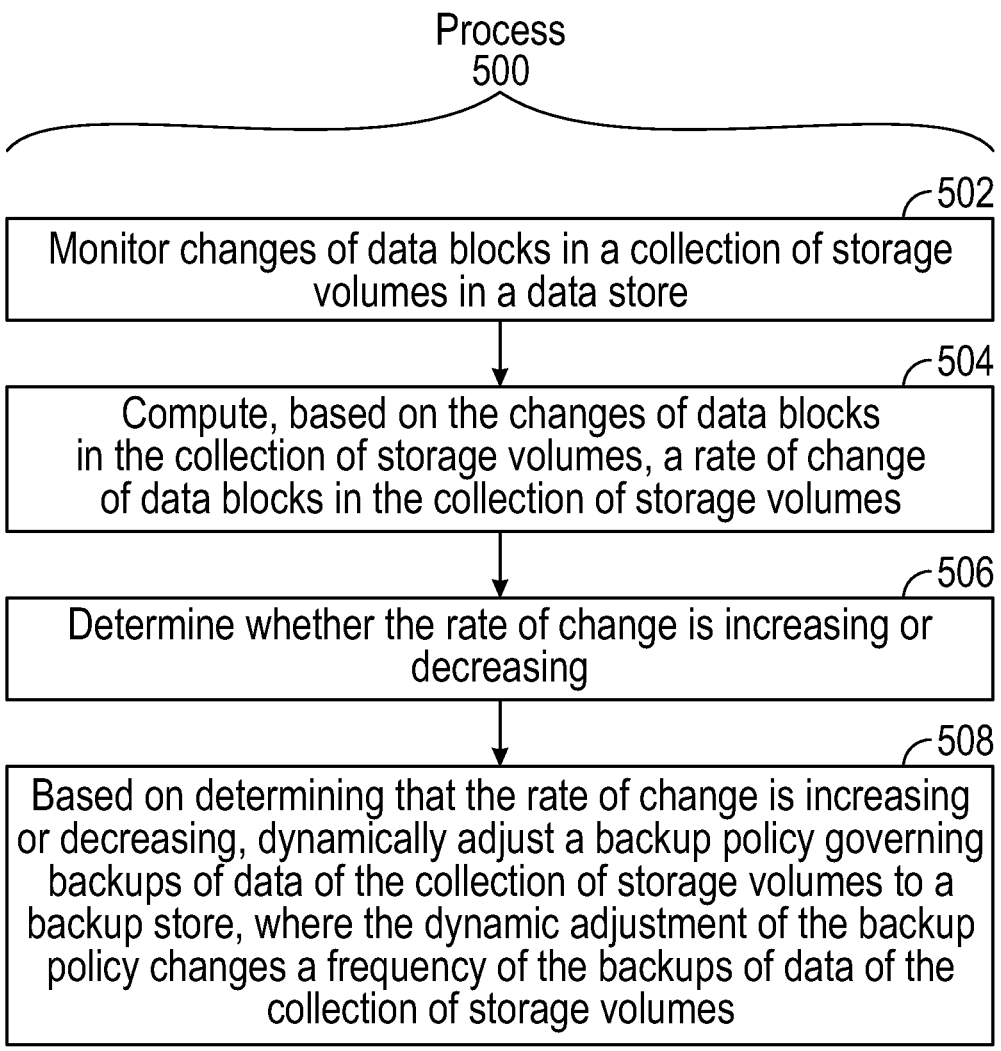

502
Monitor changes of data blocks in a collection of storage volumes in a data store 504
Compute, based on the changes of data blocks in the collection of storage volumes, a rate of change of data blocks in the collection of storage volumes 506
Determine whether the rate of change is increasing or decreasing 508
Based on determining that the rate of change is increasing or decreasing, dynamically adjust a backup policy governing backups of data of the collection of storage volumes to a backup store, where the dynamic adjustment of the backup policy changes a frequency of the backups of data of the collection of storage volumes

FIG. 5

DYNAMIC ADJUSTMENTS OF BACKUP POLICIES

BACKGROUND

Data stored in data stores can be copied to backup stores to protect against loss of data. A backup store is implemented using a collection of storage devices that is separate from storage devices of a data store. A backup control system can manage performance of data backups.

BRIEF DESCRIPTION OF THE DRAWINGS

Some implementations of the present disclosure are described with respect to the following figures.

FIG. 5 is a flow diagram of a process according to some examples.

Figure 1:
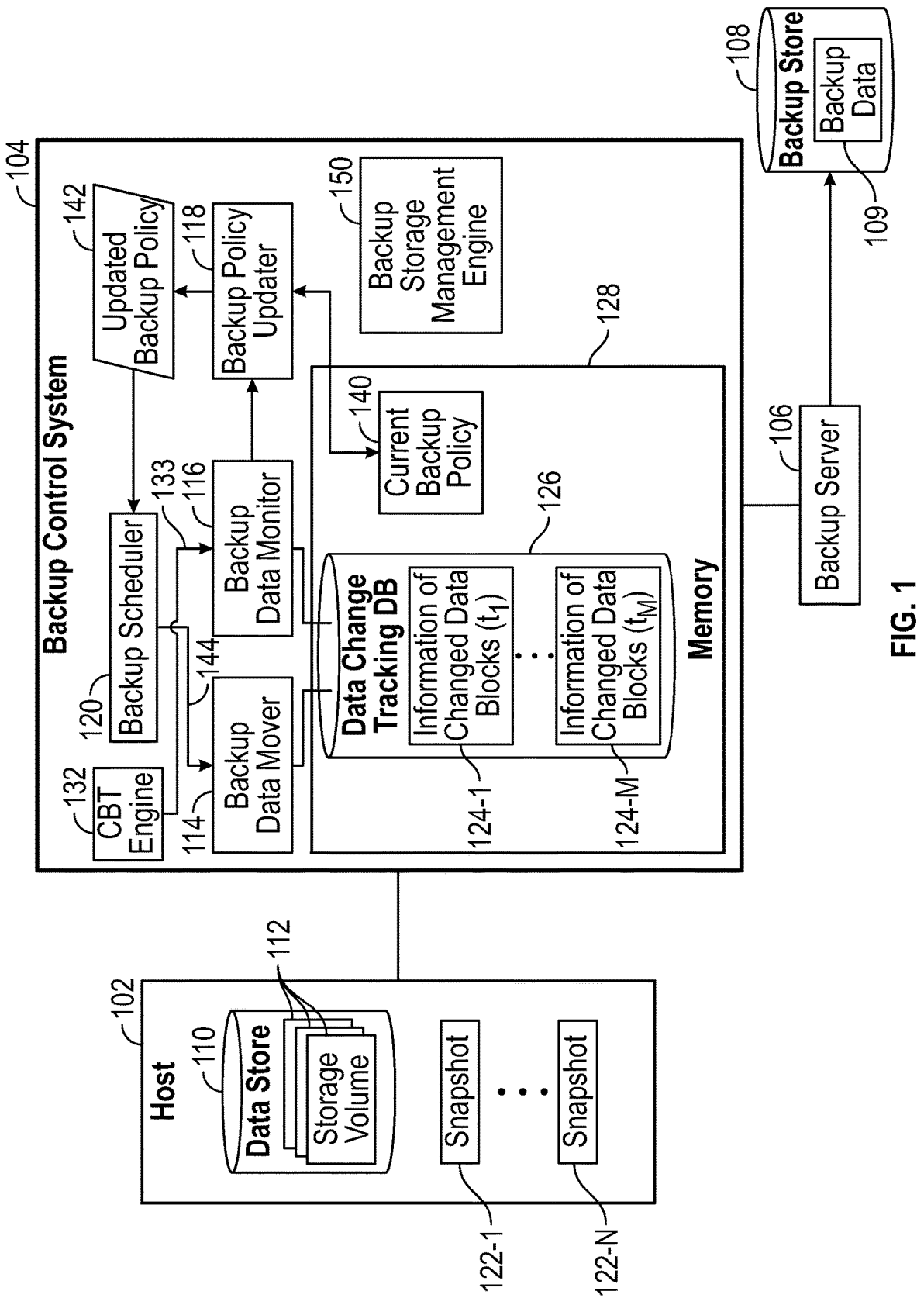
FIG. 1 is a block diagram of an arrangement that includes a host, a backup control system, and a backup server, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Data backups from a data store to a backup store are managed by a backup control system according to a backup policy. The backup policy can be set by a user (e.g., an administrator or another user) or by another entity (a program or machine).

The backup policy can specify a configuration of a collection of backup jobs to be performed. As used here, a "collection" of items can refer to a single item or multiple items. Thus, a collection of backup jobs can refer to a single backup job or multiple backup jobs. A "backup job" can include operations to be performed to copy data from a data store to a backup store.

A configuration specified by a backup policy can include where and when to perform backup jobs. For example, the backup policy can: (1) identify a data store (e.g., identify a host) for which a collection of backup jobs is to be performed, (2) specify a schedule for the collection of backup jobs, such as a periodic schedule in which backup jobs are performed periodically (e.g., once a day or another time period), and/or (3) identify a target backup store (e.g., from among multiple candidate backup stores) to which data of the collection of backup jobs is to be copied. The backup policy can also specify which portions of a data store are to be backed up.

In some cases, backup policies can be static (i.e., the backup policies are predefined and do not change with changing conditions). Thus, a backup policy that is defined by a user with a given assumption of a system's operations may become outdated as the system's conditions change.

For example, a system may execute virtual machines (VMs), which are virtualized environments that emulate physical computing systems. A backup policy may be specified for a respective collection of VMs (a single VM or multiple VMs). When the backup policy was created by a user, the collection of VMs may have been active so that the backup policy may specify short time intervals between backup jobs of data associated with the collection of VMs. An "active" VM can refer to a VM that makes relatively frequent updates of data in a data store. Over time, the collection of VMs may become less active. As a result, performing frequent data backups for the collection of VMs that has become less active may be wasteful of resources (including processing resources, communication resources, and storage resources). Given that data backups can be costly, using static backup policies can add to the overall cost of data management.

In accordance with some implementations of the present disclosure, techniques or mechanisms are provided to dynamically update backup policies based on monitoring a change rate of data blocks stored in a data store. For example, an initial backup policy may be defined for the data store. Over time, as the change rate of data blocks varies, the backup policy can be changed to adapt to the new change rate. The data blocks can be part of a collection of storage volumes. A "data block" can refer to a unit of data that is separately identifiable, such as with a block number, an offset, a memory address, or any other type of block identifier. Examples of data blocks can include sectors of a storage device, pages of data, or any other of unit of data.

A "storage volume" can refer to any container of data that can be identified by a volume identifier, such as by a logical unit number (LUN) or another type of volume identifier. A storage volume can include multiple data blocks. A "change rate" of data blocks can refer to how many data blocks of the collection of storage volumes has changed over a given time interval. The change rate of data blocks can vary as a program (e.g., a program in a VM) becomes more active or less active.

FIG. 1 is a block diagram of an example arrangement that includes a host 102, a backup control system 104, a backup server 106, and a backup store 108. The host 102 can refer to a physical computing device or a virtual computing device. Examples of physical computing devices can include any or some combination of the following: desktop computers, notebook computers, tablet computers, server computers, smartphones, game appliances, vehicles, household appliances, Internet of Things (IoT) devices, communication nodes, storage systems, wearable electronic devices, and so forth. Examples of the virtual computing devices can include any or some combination of the following: VMs, containers, or any other type of virtual computing devices.

The backup control system 104 can be implemented using a computer system that has a collection of computers. In some examples, the host 102 and the backup control system 104 can be part of the same computer system. Alternatively, the host 102 and the backup control system 104 can be implemented using different computer systems.

Although just one host 102 is depicted in FIG. 1, there can be multiple hosts in other examples. For example, in a virtualized environment, there may be multiple VMs. As another example, there may be multiple physical computing devices.

The host 102 includes or has access to a data store 110, which stores data that can be accessed by machine-readable instructions (including application programs, an operating system (OS), firmware, etc.) executed in the host 102. The data store 110 can be part of the host 102 or can be external of the host 102. The data of the data store 110 can be stored in a collection of storage devices, which can be implemented using any or some combination of disk-based storage devices, solid state drives, memory devices, and so forth. The data store 110 can be a physical data store or a virtual data store. In some examples, the data store 110 stores a collection of storage volumes 112.

The backup control system 104 can manage the backup of data stored in the data store 110, including data in the collection of storage volumes 112. In examples where there are multiple hosts 102 (e.g., multiple physical or virtual computing devices), the backup control system 104 can manage the backup of data stored in data stores associated with the respective hosts.

To perform a backup operation for the data store 110, the backup control system 104 can copy data from the data store 110 to the backup server 106, which in turn transfers the copied data to the backup store 108 for storing as backup data 109. The backup store 108 can be implemented using a collection of storage devices. The backup server 106 can be implemented using a computer system that has a collection of computers. In some examples, the backup server 106 and the backup control system 104 are implemented using separate computer systems. In other examples, the backup server 106 and the backup control system 104 are implemented using the same computer system.

The backup control system 104 includes various components, including a backup data mover 114, a backup data monitor 116, a backup policy updater 118, and a backup scheduler 120. In some examples, each of the backup data mover 114, the backup data monitor 116, the backup policy updater 118, and the backup scheduler 120 can be implemented as machine-readable instructions executable in the backup control system 104. In other examples, any or some combination of the backup data mover 114, the backup data monitor 116, the backup policy updater 118, and the backup scheduler 120 can be implemented using hardware processing circuits. Hardware processing circuits can include any or some combination of a microprocessor, a core of a multi-core microprocessor, a microcontroller, a programmable integrated circuit, a programmable gate array, or another hardware processing circuit.

The backup data monitor 116 is able to identify data blocks that have changed in the collection of storage volumes 112 for the host 102. In some examples, the backup data monitor 116 uses an output 133 of a change block tracking (CBT) engine 132 to track data blocks that have changed in the collection of storage volumes 112. An "engine" can be implemented as a hardware processing circuit or a combination of machine-readable instructions and a hardware processing circuit. The CBT engine 132 can track metadata (e.g., location and size) of input/output (I/O) operations to determine where changes are occurring in the collection of storage volumes 112.

In some examples, the host 102 is able to take snapshots of data in the data store 110. Specifically, the host 102 can take snapshots of the collection of storage volumes 112. A "snapshot" can refer to a point-in-time copy of data in the collection of storage volumes 112. Different snapshots taken at different points in time can include different versions of data. FIG. 1 shows snapshots 122-1 to 122-N (N≥1) of the collection of storage volumes 112. The CBT engine 132 is able to detect changes between successive snapshots taken at different points in time. These changes include data blocks that have changed between a first snapshot and a second snapshot (or more generally, data blocks that have changed in a group of snapshots). The CBT engine 132 identifies such changed data blocks between snapshots as changed data blocks that should be backed up to the backup store 108 as part of an incremental data backup. The CBT engine 132 can then produce its output 133 identifying the changed data blocks. The output 133 is provided to the backup data monitor 116 from the CBT engine 132.

An "incremental" data backup refers to a data backup in which just changed data blocks of the collection of storage volumes 112 since the most recent data backup are copied to the backup store 108; data blocks of the collection of storage volumes 112 that have not changed since the most recent data backup would not be copied to the backup store 108, to conserve processing, communication, and storage resources.

In examples where the host 102 is a VM, the CBT engine 132 can be part of a hypervisor (not shown). The hypervisor can create and manage execution of VMs, and the hypervisor can virtualize physical resources of a computer system for use by respective VMs. In other examples, the CBT engine 132 can be implemented elsewhere, such as in the backup data monitor 116 and so forth.

In some examples, the backup data monitor 116 can store changed data blocks information in a data change tracking database 126. The data change tracking database 126 can be stored in a memory 128, for example, which can be implemented using a collection of memory devices such as dynamic random access memory (DRAM) devices, static random access memory (SRAM) devices, flash memory devices, and so forth.

Multiple instances of the changed data blocks information can be stored in the data change tracking database 126 to keep a historical record of data changes in respective time intervals. As depicted in FIG. 1, instances of changed data blocks information are represented as 124-1 to 124-M (M≥1). The changed data blocks information instance 124-1 refers to changed data blocks that are detected in time interval $t_1$, and the changed data blocks information instance 124-M refers to changed data blocks that are detected in time interval $t_M$. As an example, each changed data blocks information instance 124-*j* (j=1 to M) can identify (e.g., by block numbers, offsets, memory addresses, etc.) changed data blocks detected by the CBT engine 132 in a corresponding time interval $t_j$.

The backup data mover 114 can access the data change tracking database 126 to determine what data blocks are to be backed up to the backup store 108 in a current time interval $t_j$. The backup data mover 114 can retrieve the changed data blocks information instance 124-*j* from the data store 110 and copy the changed data blocks identified by the changed data blocks information instance 124-*j* to the backup server 106, to perform an incremental backup of the changed data blocks to the backup store 108. The backup data mover 114 can retrieve the identified changed data blocks from a snapshot (e.g., the latest snapshot taken by the host 102).

The backup policy updater 118 is able to dynamically update a backup policy in response to changed data blocks information provided by the backup data monitor 116. A current backup policy 140 in use for backing up data of the collection of storage volumes 112 can be stored in the memory 128 or in a different memory. If there are multiple collections of storage volumes in the data store 110 (or in multiple data stores) for which data backup is to be performed, there may be multiple current backup policies stored for the multiple collections of storage volumes.

For example, the backup policy updater 118 can access (or can be provided) with changed data blocks information instance 124-*j* for a current time interval $t_j$. Based on the changed data blocks information instance 124-*j*, the backup policy updater 118 can compute a change rate of data blocks associated with the collection of storage volumes 112 in the current time interval $t_j$. The computation of the change rate of data blocks associated with the collection of storage volumes 112 in the current time interval can be based on dividing the quantity of changed data blocks (indicated by the changed data blocks information instance 124-*j*) by a time length of the current time interval $t_j$. In other examples, the backup data monitor 116 can compute the change rate of data blocks associated with the collection of storage volumes 112 in the current time interval $t_j$, and can provide the change rate of data blocks to the backup policy updater 118.

In further examples, the backup policy updater 118 can compute a change rate of data blocks based on changed data blocks in multiple time intervals. In such further examples, the backup policy updater 118 (or the backup data monitor 116) can compute the change rate of data blocks based on total quantity of changed data blocks indicated by multiple changed data blocks information instances and the total time length of multiple time intervals. For example, the backup policy updater 118 (or the backup data monitor 116) can compute a total quantity (Q) of changed data blocks in time intervals $t_j$, $t_{j-1}$, and $t_{j-2}$ based on changed data blocks information instances 124-*j*, 124-*j*-1, and 124-*j*-2, and can divide Q by a total time length (T) of the time intervals $t_j$, $t_{j-1}$, and $t_{j-2}$ (Q/T) to compute the change rate of data blocks.

Based on the change rate of data blocks for the collection of storage volumes 112, the backup policy updater 118 can determine whether the current backup policy 140 is to be modified. In some examples, the backup policy updater 118 can autonomously determine whether the current backup policy 140 is to be modified. In other examples, the backup policy updater 118 can provide an indication to a user, e.g., through a user interface (UI) that the current backup policy 140 is to be modified. The indication provided to the UI can include the computed change rate of data blocks or a recommended modification of the current backup policy 140. The user can specify a new backup policy to use, specify a modification of the current backup policy 140 (e.g., specify that a backup interval is to be modified from the backup interval specified by the current backup policy 140, or can accept or reject the recommended modification of the current backup policy 140 presented in the UI.

The current backup policy 140 can include a frequency parameter that specifies a backup interval to control a frequency at which data backups are performed. For example, if the data backup interval specified by the frequency parameter is time period T1, then a data backup would be performed every T1 period.

In further examples, a backup policy may specify other backup parameters in addition to or as an alternative to the frequency parameter. Other backup parameters can include any or some combination of the following: a protection group parameter, a protection type parameter, an archival or retention interval parameter, a malware scan parameter, or any other parameter.

The protection group parameter can specify a group of data objects (e.g., storage volumes or other data objects such as blocks, pages, etc.) of the data store 110 that are to be backed up together. The group of data objects to be backed up together can include just a single data object, e.g., the protection group parameter can specify that data of a given storage volume is to be backed up on an individual basis. Alternatively, the group of data objects to be backed up together can include multiple data objects, e.g., a specified group of multiple storage volumes is to be backed up together. In some examples, the protection group parameter can include identifier(s) of the data object(s) that is (are) to be backed up together as a group.

The protection type parameter can specify a type of protection to be offered by the data backup. Examples of types of protection that can be specified by the protection type parameter include a local backup type of protection, a remote backup type of protection, an air-gap backup type of protection, and so forth. The local backup type of protection uses a data backup in which the backup store (e.g., 108) is locally co-located with a host (e.g., 102) being protected (e.g., the backup store and the host are on the same premises, such as same physical facility, same campus, same building, same warehouse, etc.). The remote backup type of protection uses a data backup in which the backup store is provided in a cloud or other remote location that is remotely located from the host being protected. The air-gap backup type of protection uses a data backup in which the backup store can be physically isolated (e.g., physically disconnected or removed) or logically isolated (e.g., using a security mechanism) after data has been backed up to the backup store. The protection type parameter can be set to different values to indicate which of the different protection types to use.

The archival or retention interval parameter can specify a time interval associated with archiving or retaining a data backup in a backup store. For example, the archival or retention interval parameter can specify that the data backup is to be kept for a specified time period, after which the data backup can be discarded or archived.

The malware scan parameter can specify whether a malware scan is to be performed on a data backup stored to the backup store. The malware scan can include a scan for a virus, a worm, ransomware, and so forth. The malware scan parameter if set to a first value can indicate no malware scan is to be performed, and if set to a second value can indicate that a malware scan is to be performed on the data backup. The malware scan parameter can also be set to different values to indicate respective different types of malware scans to apply on the data backup.

The backup policy updater 118 can modify any or some combination of the backup parameters of the current backup policy 140 based on changed data block monitoring performed by the backup data monitor 116. For example, if the backup policy updater 118 determines that the change rate of data blocks for the collection of storage volumes 112 has increased over time (based on the changed data blocks information instances in the data change tracking database 126), then the backup policy updater 118 can reduce the backup interval to trigger more frequent data backups of the collection of storage volumes 112. On the other hand, if the backup policy updater 118 determines that the change rate of data blocks for the collection of storage volumes 112 has decreased over time (based on the changed data blocks information instances in the data change tracking database 126), then the backup policy updater 118 can increase the backup interval to trigger less frequent data backups of the collection of storage volumes 112. The increased or decreased backup interval is included in an updated backup policy 142 generated by the backup policy updater 118.

The generated updated backup policy 142 can be a modified version of the current backup policy 140, with one or more backup parameters modified. The modification of the one or more backup parameters can be performed autonomously by the backup policy updater 118, or may be specified by a user such as through a UI.

In further examples, the backup policy updater 118 can modify the protection group parameter based on the change rate of data blocks and/or based on another factor. For example, the current backup policy 140 may specify that a data of storage volumes A, B, and C are to be backed up together based on the assumption that the storage volumes A, B, and C share similar change rates of data blocks. However, the backup policy updater 118 may detect that the change rates of data blocks of storage volumes A, B, and C may start deviating significantly from one another, at which point the backup policy updater 118 may update the protection group parameter to specify that the data of storage volumes A, B, and C are to be backed up individually, or alternatively, that the data of storage volume A, B, and/or C is to be backed up together with another collection of storage volumes.

As a further example, the current backup policy 140 may specify that a data of storage volumes A, B, and C are to be backed up together based on storage volumes A, B, and C being associated with a particular application program. Over time, the backup policy updater 118 may detect that additional application program(s) may start to access one or more of storage volumes A, B, and C, and that such additional program(s) may have access patterns that differ from the particular application program. In response to such detection, the backup policy updater 118 can modify the protection group parameter to specify a different grouping for data backups of storage volumes A, B, and C.

The backup policy updater 118 can also modify the protection type parameter based on one or more factors, including a property of the collection of storage volumes 112. For example, different collections of storage volumes may be assigned different priority or criticality levels. A higher priority or more critical collection of storage volumes may be backed up to a remote backup store or a backup store that implements an air-gap. A lower priority or less critical collection of storage volumes may be backed up to a local backup store. Other factors that may impact use of different protection types can include a size of data in the collection of storage volumes, a data pattern of the data in the collection of storage volumes, a uniqueness of the data in the collection of storage volumes, and so forth. Changes in any of the various factors can be detected by the backup data monitor 116 and indicated to the backup policy updater 118, which can change the protection type parameter to generate the updated backup policy 142.

The backup policy updater 118 can also modify the archival or retention interval parameter based on the change rate of data blocks and/or based on another factor. For example, a shorter archival or retention interval can be set for backup data if the collection of storage volumes has a low change rate of data blocks. A low change rate of data blocks indicates that the data of the collection of storage volumes is not changing frequently, and thus the backup data can be discarded or archived after a shorter time period.

The backup policy updater 118 can also modify the malware scan parameter based on one or more factors. For example, the backup data monitor 116 may detect an unusual change block pattern or change in size that may be indicative of an attack on the data of the collection of storage volumes. The backup data monitor 116 may indicate the unusual change block pattern or change in size to the backup policy updater 118 to cause the backup policy updater 118 to change the malware scan parameter when generating the updated backup policy 142.

The updated backup policy 142 generated by the backup policy updater 118 is provided to the backup scheduler 120.

Based on the updated backup policy 142, the backup scheduler 120 can issue a backup request 144 to the backup data mover 114 to initiate a data backup of the collection of storage volumes 112. The requested data backup is according to the backup parameter(s) included in the updated backup policy 142.

The backup control system 104 further includes a backup storage management engine 150. The backup storage management engine 150 can manage a configuration of the backup store 108 (or the collection of storage devices used to implement the backup store 108). For example, the backup storage management engine 150 can determine, based on information of changes of data blocks in the collection of storage volumes, whether the collection of storage volumes is increasing in size. For example, the backup storage management engine 150 can access changed data blocks information (e.g., any or some combination of 124-1 to 124-M) to determine changes of the data blocks. Based on the accessed changed data blocks information, the backup storage management engine 150 can determine whether the collection of storage volumes 112 is increasing in size. For example, the backup storage management engine 150 can detect that data is being added to new data blocks are added and/or that the amount of data stored in existing data blocks of the collection of storage volumes 112 is increasing. The backup storage management engine 150 can determine a trend in the data growth of the collection of storage volumes 112. If the trend indicates that the data growth is rising for greater than some threshold amount of time or that the data growth is rising at greater than a threshold growth rate, the backup storage management engine 150 can add storage capacity to the backup store 108, such as by provisioning new storage device(s) and/or allocating more storage space in existing storage device(s) to the backup store 108.

Figure 2:
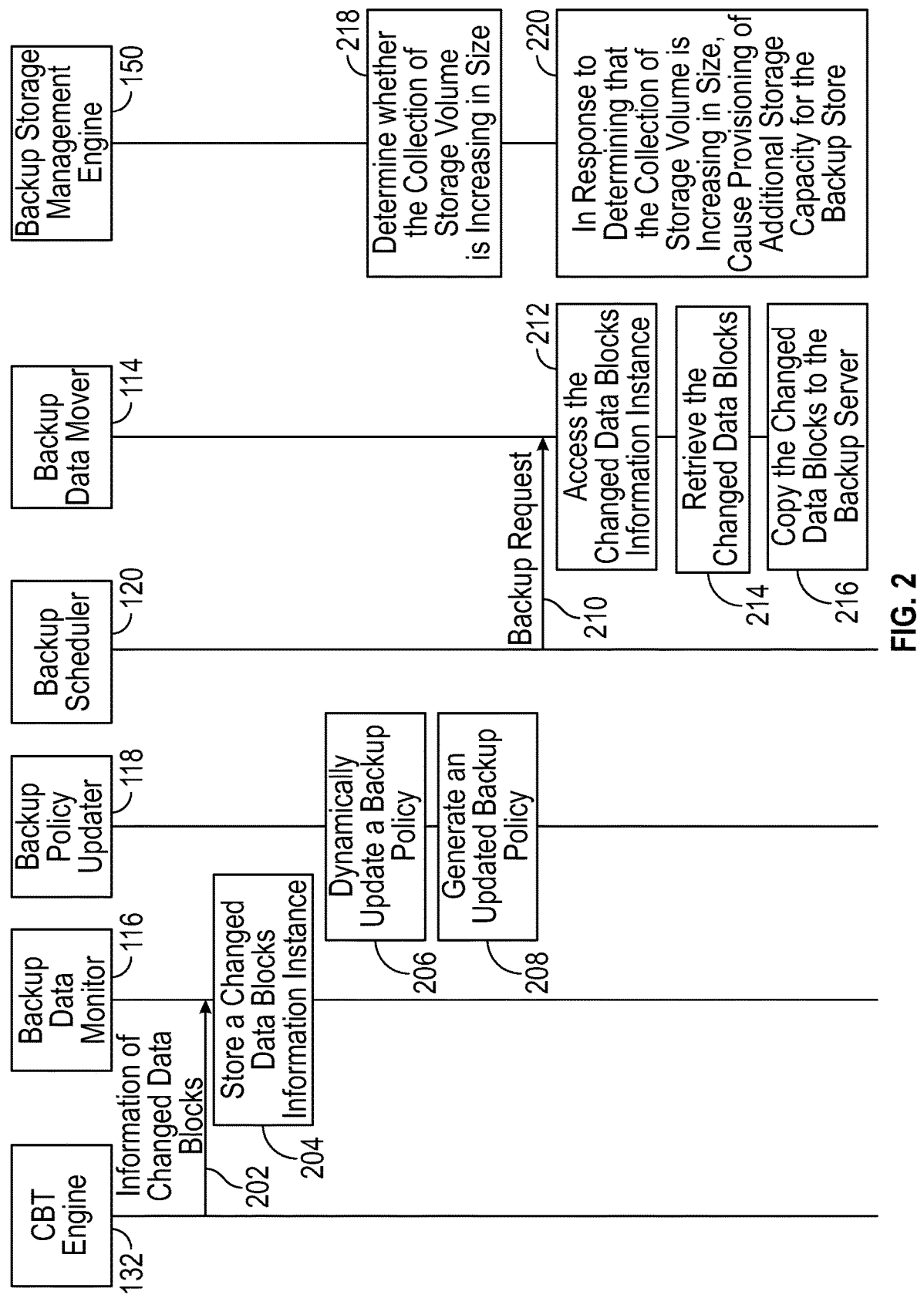
FIG. 2 is a flow diagram of a process according to some examples.

FIG. 2 is a flow diagram of a process of the backup control system 104 according to some examples of the present disclosure. Although a specific sequence of tasks is depicted in FIG. 2, in other examples, the tasks can be performed in a different order, some tasks may be omitted, and/or other tasks may be included.

The backup data monitor 116 in the backup control system 104 receives (at 202) information of changed data blocks from the CBT engine 132. The information of changed data blocks is included in the output 133 of the CBT engine 132 shown in FIG. 1. The CBT engine 132 can provide the information of changed data blocks upon request by the backup data monitor 116, or alternatively, the CBT engine 132 can push the information of changed data blocks to the backup data monitor 116 on a periodic basis or in response to another event.

Based on the information of changed data blocks from the CBT engine 132, the backup data monitor 116 stores (at 204) a changed data blocks information instance (e.g., 124-*j* in FIG. 1, where j=1 to M) in a data change tracking database 126. The changed data blocks information instance 124-*j* identifies changed data blocks that are detected in a current time interval $t_j$.

The backup policy updater 118 dynamically updates (at 206) a backup policy in response to changed data blocks information provided by the backup data monitor 116. For example, the backup policy updater 118 can compute a change rate of data blocks (or alternatively, the backup policy updater 118 can receive the change rate of data blocks computed by the backup data monitor 116), and based on the change rate of data blocks, the backup policy updater 118 can update backup parameter(s) in the backup policy (e.g., the current backup policy 140 of FIG. 1). The backup policy updater 118 can also update backup parameter(s) in the backup policy according to other factors. The backup parameter(s) update can include any or some combination of the following: a frequency parameter, a protection group parameter, a protection type parameter, an archival or retention interval parameter, a malware scan parameter, or any other parameter.

The backup policy updater 118 generates (at 208) an updated backup policy (e.g., 142 in FIG. 1) based on the update performed at 206. The backup policy updater 118 can store the updated backup policy in the memory 128 of FIG. 1, and/or can provide the updated backup policy to the backup scheduler 120.

In further examples, the backup policy updater 118 can identify a partial subset of the collection of storage volumes 112 in which the change of data blocks is concentrated. For example, the backup policy updater 118 can determine that a majority of changes of data blocks are occurring in a first portion A of the collection of storage volumes 112, while much fewer changes of data blocks are occurring in a second portion B of the collection of storage volumes 112. In such a scenario, the backup policy updater 118 can determine that the data block changes are concentrated in the first portion A. The backup policy updater 118 can set a backup policy for the partial subset (e.g., the first portion A) of the collection of storage volumes 112 that is different from a backup policy for a remainder (e.g., the second portion B) of the collection of storage volumes 112.

In response to the updated backup policy, the backup scheduler 120 issues (at 210) a backup request (e.g., 144 in FIG. 1) to the backup data mover 114 to initiate a data backup of the collection of storage volumes 112. The requested data backup is according to the backup parameter(s) included in the updated backup policy 142. For example, the backup request is issued at a frequency according to the frequency parameter, can specify a protection group (including one or more data objects to be backed up together) according to the protection group parameter, can specify a protection type (e.g., a local backup type, a remote backup type, an air-gap backup type, etc.) for the backup operation, can specify an archival or retention time interval according to the archival or retention interval parameter, and/or can specify whether or not to perform malware scanning of backup data according to the malware scan parameter.

The backup data mover 114 accesses (at 212) the changed data blocks information instance 124-*j* in the data change tracking database 126 to determine what data blocks are to be backed up to the backup store 108 in the current time interval $t_j$. The backup data mover 114 retrieves (at 214) the changed data blocks from the data store 110 (or a snapshot) and copies (at 216) the changed data blocks identified by the changed data blocks information instance 124-*j* to the backup server 106, to perform an incremental backup of the changed data blocks to the backup store 108.

In some examples, the backup storage management engine 150 in the backup control system 104 can determine (at 218), based on information of changes of data blocks in the collection of storage volumes 112, whether the collection of storage volumes is increasing in size. The information of changes of data blocks in the collection of storage volumes can be based on changed data blocks information (such as in the data change tracking database 126 of FIG. 1) accessed by the backup storage management engine 150. In response to determining that the collection of storage volumes is increasing in size, the backup storage management engine 150 causes provisioning (at 220) of additional storage capacity for the backup store 108, such as adding new storage device(s) and/or allocating more storage space in existing storage device(s) for the backup store 108.

By using backup techniques or mechanisms according to some implementations of the present disclosure, more efficient usage of resources is provided for backing up data of a data store to a backup store, by adjusting backup parameter(s) of a backup policy according to evolving conditions of system operations (e.g., operations of VMs or other hosts). The more efficient usage of resources can help in reducing the likelihood that a backup server becomes overwhelmed with data backup operations.

In scenarios where data backup is provided using an as-a-Service (aaS) framework, costs associated with using data backup services can be reduced by dynamically adjusting backup policies. For example, a tenant (which can refer to a group of users that can access a service of the aaS framework) may be charged for each data backup performed. By reducing a frequency of data backups as system conditions evolve, the tenant can reduce the charges paid to a backup service provider.

Also, by adjusting backup policies according to changing system conditions, more effective data recovery points may be implemented. A "data recovery point" can refer to a corresponding data backup. Each data backup contains data that can be used to recover from an error or fault of a data store. Thus, if changing system conditions indicate that more frequent data backups should be performed, then a greater quantity of data recovery points can be obtained.

Additionally, by controlling whether malware scanning is to be performed for data backups using the malware scan parameter, malware attacks may be detected and remediation actions can be taken if malware attacks are detected. Moreover, in some examples, information acquired by the backup data monitor 116 may be communicated to a user or other entity, to provide insights into data usage patterns.

Figure 3:
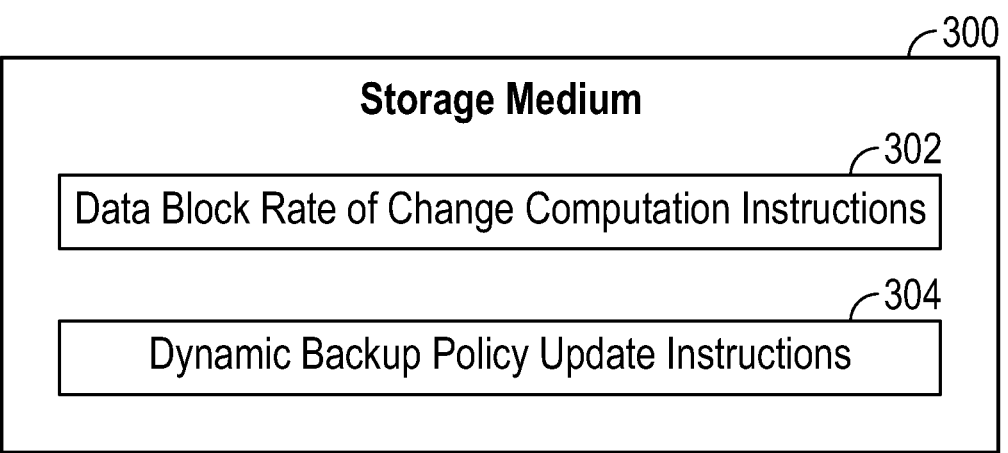
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include the backup control system 104 of FIG. 1, for example.

The machine-readable instructions include data block rate of change computation instructions 302 to compute a rate of change of data blocks of a collection of storage volumes in a data store. Changes of data blocks is detected based on monitoring of operations on the collection of storage volumes. In some examples, the monitoring of operations can be performed by the backup data monitor 116 of FIG. 1. The CBT engine 132 can track changes in data blocks in the collection of storage volumes, and can output information of the changes in data blocks to the backup data monitor 116. Based on the information of the changes in data blocks, the backup data monitor 116 or another entity, such as the backup policy updater 118 of FIG. 1, can compute the rate of change of data blocks in the collection of storage volumes. The rate of change of data blocks of the collection of storage volumes is based on a difference between multiple snapshots of data of the collection of storage volumes in the data store.

The machine-readable instructions include dynamic backup policy update instructions 304 to, based on the rate of change of data blocks of the collection of storage volumes, dynamically adjust a backup policy governing backups of data of the collection of storage volumes to a backup store. The dynamic adjustment of the backup policy changes a quantity of the backups of data of the collection of storage volumes. In some examples, the dynamic adjustment of the backup policy changes a backup time interval between the backups of data of the collection of storage volumes.

In some examples, in response to detecting that the rate of change of data blocks of the collection of storage volumes is decreasing, the machine-readable instructions dynamically adjust the backup policy to increase the backup time interval between the backups of data of the collection of storage volumes.

In some examples, in response to detecting that the rate of change of data blocks of the collection of storage volumes is increasing, the machine-readable instructions dynamically adjust the backup policy to decrease the backup time interval between the backups of data of the collection of storage volumes.

In some examples, the machine-readable instructions determine, based on information of the changes of data blocks in the collection of storage volumes, whether the collection of storage volumes is increasing in size. In response to determining that the collection of storage volumes is increasing in size, the machine-readable instructions cause provision of additional storage capacity for the backup store.

Figure 4:
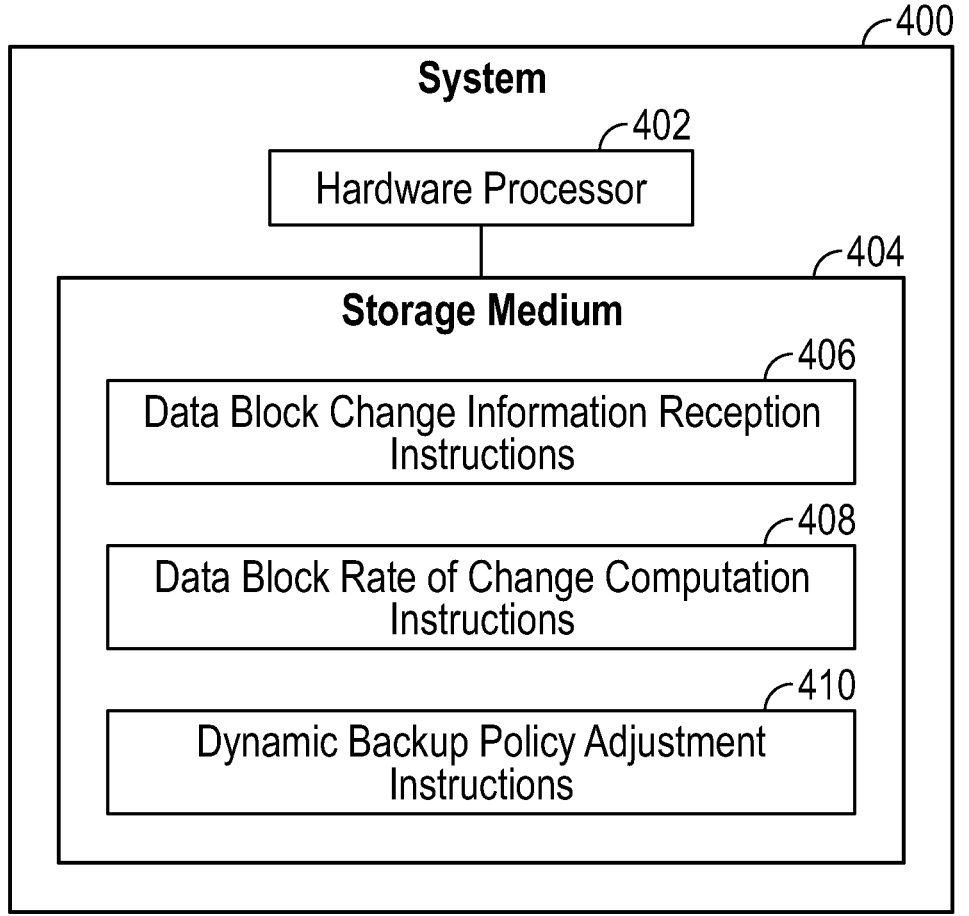
FIG. 4 is a block diagram of a system according to some examples.

FIG. 4 is a block diagram of a system 400 that includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions executable on the hardware processor 402 to perform various tasks. Machine-readable instructions executable on a hardware processor can refer to the instructions executable on a single hardware processor or the instructions executable on multiple hardware processors.

The machine-readable instructions in the storage medium 404 include data block change information reception instructions 406 to receive information of changes of data blocks of a collection of storage volumes in a data store. The information of changes of data blocks is based on monitoring of operations on the collection of storage volumes, such as by the combination of the CBT engine 132. The information of changes of data blocks of the collection of storage volumes can be received by the backup data monitor 116 of FIG. 1 from the CBT engine 132.

The machine-readable instructions in the storage medium 404 include data block rate of change computation instructions 408 to compute, based on the information of the changes of data blocks of the collection of storage volumes, a rate of change of data blocks of the collection of storage volumes. The rate of change of data blocks is based on a quantity of changed data blocks in a time interval. The rate of change of data blocks of the collection of storage volumes is computed based on a difference between multiple snapshots of data of the collection of storage volumes in the data store.

The machine-readable instructions in the storage medium 404 include dynamic backup policy adjustment instructions 410 to, based on the rate of change of data blocks in the collection of storage volumes, dynamically adjust a frequency parameter in a backup policy governing backups of data of the collection of storage volumes to a backup store. The adjusted frequency parameter changes a frequency of the backups of data of the collection of storage volumes.

In some examples, the machine-readable instructions in the storage medium 404 can further dynamically adjust any or some combination of the following backup parameters: a protection group parameter, a protection type parameter, an archival or retention interval parameter, or a malware scan parameter.

FIG. 5 is a flow diagram of a process 500, which can be performed by the backup control system 104 of FIG. 1, for example. The process 500 includes monitoring (at 502) changes of data blocks in a collection of storage volumes in a data store. The monitoring can be performed by the CBT engine 132 of FIG. 1, for example.

The process 500 includes computing (at 504), based on the changes of data blocks in the collection of storage volumes, a rate of change of data blocks in the collection of storage volumes. The rate of change of data blocks is based on a quantity of changed data blocks in a given time interval. The rate of change of data blocks in the collection of storage volumes is computed based on a difference between multiple snapshots of data of the collection of storage volumes in the data store.

The process 500 includes determining (at 506) whether the rate of change is increasing or decreasing. Based on determining that the rate of change is increasing or decreasing, the process 500 dynamically adjusts (at 508) a backup policy governing backups of data of the collection of storage volumes to a backup store. The dynamic adjustment of the backup policy changes a frequency of the backups of data of the collection of storage volumes.

A storage medium (e.g., 300 in FIG. 3 or 404 in FIG. 4) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

compute a rate of change of data blocks of a collection of storage volumes in a data store, wherein:

changes of data blocks are detected based on monitoring of operations on the collection of storage volumes;

the rate of change of data blocks of the collection of storage volumes is based on a difference between a plurality of snapshots of data of the collection of storage volumes in the data store;

the collection of storage volumes is for a collection of virtual machines (VMs); and a backup policy governing backups of data of the collection of storage values to a backup store comprises a protection group parameter that specifies a group of data objects of the collection of storage volumes to be backed up together, the backup policy being specific to the collection of VMs;

based on detecting whether the rate of change of data blocks of the collection of storage values is increasing or decreasing over multiple time intervals, dynamically adjust the backup policy, wherein the dynamic adjustment of the backup policy:

changes a quantity of the backups and a frequency of the backups of data of the collection of storage volumes; and adjusts the protection group parameter to modify the group of data objects to be backed up together according to the rate of change; and adjusts a protection type parameter that specifies a type of protection to be offered by the backups of data, wherein the dynamic adjustment of the protection type parameter comprises selecting from among a local backup type of protection, a remote backup type of protection, and an air-gap backup type of protection; and initiate a data backup according to the backup policy, as adjusted.

2. The non-transitory machine-readable storage medium of claim 1, wherein the dynamic adjustment of the backup policy changes a backup time interval between the backups of data of the collection of storage volumes, and wherein the instructions upon execution cause the system to:

in response to detecting that the rate of change of data blocks of the collection of storage volumes is decreasing, dynamically adjust the backup policy to increase the backup time interval between the backups of data of the collection of storage volumes; or in response to detecting that the rate of change of data blocks of the collection of storage volumes is increasing, dynamically adjust the backup policy to decrease the backup time interval between the backups of data of the collection of storage volumes.

3. The non-transitory machine-readable storage medium of claim 1, wherein the instructions upon execution cause the system to:

determine, based on information of the changes of data blocks of the collection of storage volumes, whether the collection of storage volumes is increasing in size; and in response to determining that the collection of storage volumes is increasing in size, cause provision of additional storage capacity for the backup store.

4. The non-transitory machine-readable storage medium of claim 1, wherein the plurality of snapshots of data of the collection of storage volumes are taken by a host that has access to the data store.

5. The non-transitory machine-readable storage medium of claim 1, wherein the instructions upon execution cause the system to:

identify a partial subset of the collection of storage volumes in which the change of data blocks is concentrated; and set a backup policy for the partial subset of the collection of storage volumes that is different from a backup policy for a remainder of the collection of storage volumes.

6. The non-transitory machine-readable storage medium of claim 1, wherein the dynamic adjustment of the backup policy comprises adjusting a frequency parameter that governs a frequency of the backups of data.

7. The non-transitory machine-readable storage medium of claim 6, wherein the instructions upon execution cause the system to:

based on the monitoring, dynamically adjust an archival or retention interval parameter that specifies a time interval associated with archiving or retaining a data backup in the backup store.

8. The non-transitory machine-readable storage medium of claim 6, wherein the instructions upon execution cause the system to:

based on the monitoring, dynamically adjust a malware scan parameter that specifies whether a malware scan is to be performed on a data backup stored to the backup store.

9. A system comprising:

a hardware processor; and a non-transitory machine-readable storage medium storing instructions executable on the hardware processor to:

obtain information of changes of data blocks of a collection of storage volumes in a data store, wherein the information of changes of data blocks is based on monitoring of operations on the collection of storage volumes, the information of the changes of data blocks in the collection of storage volumes comprising a plurality of changed data blocks information instances each:

identifying one or more changed data blocks;

being based on a difference between at least two snapshots of a plurality of snapshots of data of the collection of storage volumes in the data store; and corresponding to a respective time interval;

compute, based on the information of the changes of data blocks in the collection of storage volumes, a rate of change of data blocks of the collection of storage volumes, wherein computing the rate of change of data blocks of the collection of storage volumes comprises dividing a quantity of changed data blocks, as indicated by one or more of the plurality of changed data blocks information instances, by the respective time intervals corresponding to the one or more of the plurality of changed data blocks information instances;

based on detecting a change over time in the rate of change of data blocks in the collection of storage volumes, dynamically adjust a frequency parameter in a backup policy governing backups of data of the collection of storage volumes to a backup store, wherein the adjusted frequency parameter changes a frequency of the backups of data of the collection of storage volumes; and initiate a data backup according to the backup policy, as adjusted.

10. The system of claim 9, wherein the instructions are executable on the hardware processor to:

based on one or more of the rate of change of data blocks in the collection of storage volumes or another factor, dynamically adjust a protection group parameter that specifies a group of data objects to be backed up together.

11. The system of claim 9, wherein the instructions are executable on the hardware processor to:

based on a property of the collection of storage volumes, dynamically adjust a protection type parameter that specifies a type of protection to be offered by the data backup.

12. The system of claim 9, wherein the instructions are executable on the hardware processor to:

based on the rate of change of data blocks of the collection of storage volumes, specify a time interval associated with archiving or retaining a data backup in the backup store.

13. The system of claim 9, wherein the instructions are executable on the hardware processor to:

based on a detected pattern of the changes of data blocks in the collection of storage volumes or a detected change in size of the collection of storage volumes, dynamically adjust a malware scan parameter that specifies whether a malware scan is to be performed on a data backup stored to the backup store.

14. The system of claim 9, wherein dividing a quantity of changed data blocks, as indicated by one or more of the plurality of changed data blocks information instances, by the respective time intervals corresponding to the one or more of the plurality of changed data blocks information instances comprises determining a quotient of a total quantity of changed data blocks indicated by multiple changed data blocks information instances and a total time length of multiple respective time intervals.

15. The system of claim 9, wherein the instructions are executable on the hardware processor to:

in response to detecting that the rate of change of data blocks of the collection of storage volumes is decreasing, dynamically adjust the backup policy to decrease the frequency of the backups of data of the collection of storage volumes; or in response to detecting that the rate of change of data blocks of the collection of storage volumes is increasing, dynamically adjust the backup policy to increase the frequency of the backups of data of the collection of storage volumes.

16. A computer-implemented method, comprising:

monitoring changes of data blocks in a collection of storage volumes in a data store, the collection of storage volumes being for a collection of virtual machines (VMs), a backup policy governing backups of data of the collection of storage values to a backup store comprising a protection group parameter that specifies a group of data objects of the collection of storage volumes to be backed up together, the backup policy being specific to the collection of VMs;

computing, based on the changes of data blocks in the collection of storage volumes, a rate of change of data blocks in the collection of storage volumes, wherein the rate of change of data blocks in the collection of storage volumes is based on a difference between a plurality of snapshots of data of the collection of storage volumes in the data store;

determining whether the rate of change is increasing or decreasing;

based on determining that the rate of change is increasing or decreasing over multiple time intervals, dynamically adjusting a backup policy, wherein the dynamic adjustment of the backup policy:

changes a frequency of the backups of data of the collection of storage volumes;

adjusts the protection group parameter to modify the group of data objects to be backed up together according to the change over time in the rate of change of data blocks of the collection of storage values; and dynamically adjusting a protection type parameter that specifies a type of protection to be offered by the backups of data, wherein the dynamic adjustment of the protection type parameter comprises selecting from among a local backup type of protection, a remote backup type of protection, and an air-gap backup type of protection; and initiating a data backup according to the backup policy, as adjusted.

17. The computer-implemented method of claim 16, further comprising:

determining, based on information of changes of data blocks in the collection of storage volumes, whether the collection of storage volumes is increasing in size; and in response to determining that the collection of storage volumes is increasing in size, provisioning additional storage capacity for the backup store.

* * * * *